(12) United States Patent
Li et al.

(10) Patent No.: US 10,434,894 B2
(45) Date of Patent: Oct. 8, 2019

(54) VEHICLE BATTERY PACK ASSEMBLY

(71) Applicant: GM Global Technology Operations LLC, Detroit, MI (US)

(72) Inventors: Wei Li, Troy, MI (US); Mark W. Verbrugge, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 15/877,413

(22) Filed: Jan. 23, 2018

(65) Prior Publication Data

US 2019/0225093 A1     Jul. 25, 2019

(51) Int. Cl.
| | |
|---|---|
| *B60K 1/04* | (2019.01) |
| *B60L 50/60* | (2019.01) |
| *B62D 25/20* | (2006.01) |
| *H01M 10/44* | (2006.01) |
| *B60L 58/21* | (2019.01) |
| *B60L 50/64* | (2019.01) |
| *H01M 2/10* | (2006.01) |
| *H01M 4/525* | (2010.01) |
| *H01M 4/505* | (2010.01) |
| *B62D 21/15* | (2006.01) |

(52) U.S. Cl.
CPC ............. *B60L 50/66* (2019.02); *B60L 50/64* (2019.02); *B60L 58/21* (2019.02); *B62D 25/20* (2013.01); *H01M 10/441* (2013.01); *B60K 1/04* (2013.01); *B60K 2001/0438* (2013.01); *B62D 21/152* (2013.01); *H01M 2/1083* (2013.01); *H01M 4/505* (2013.01); *H01M 4/525* (2013.01)

(58) Field of Classification Search
CPC .... B60L 11/1877; B60L 11/1879; B60K 1/04; B60K 2001/0438; B60K 2001/0405
See application file for complete search history.

(56) References Cited

U.S. PATENT DOCUMENTS

| | | | |
|---|---|---|---|
| 9,579,963 B2 * | 2/2017 | Landgraf | B60K 1/04 |
| 10,195,929 B2 * | 2/2019 | Kusumi | B60K 1/04 |
| 2013/0022851 A1 * | 1/2013 | De Oliveira | B60K 1/04 |
| | | | 429/100 |
| 2014/0117716 A1 * | 5/2014 | Patberg | B62D 21/157 |
| | | | 296/187.08 |
| 2014/0186659 A1 * | 7/2014 | Dhar | H01M 16/00 |
| | | | 429/9 |

(Continued)

OTHER PUBLICATIONS

Robert Ball of Tata Motors European Technical Centre, "Traction Batteries Made up of Dissimilar Cells", ResearchGate Conference Paper published Jan. 2014, cover page along with pp. 1-6, United Kingdom.

(Continued)

*Primary Examiner* — Brian L Swenson
(74) *Attorney, Agent, or Firm* — Quinn IP Law

(57) ABSTRACT

A battery system for a vehicle, such as an electric vehicle, includes a first battery pack and a second battery pack. The first battery pack is configured to be disposed at an outer periphery of the second battery pack and outboard of the second battery pack on the vehicle. The first battery pack has a relatively high power density in comparison to the second battery pack, and the second battery pack has a relatively high energy density in comparison to the first battery pack.

20 Claims, 5 Drawing Sheets

(56) References Cited

U.S. PATENT DOCUMENTS

| | | | |
|---|---|---|---|
| 2015/0072196 A1* | 3/2015 | Soleski | B60R 16/03 |
| | | | 429/90 |
| 2015/0283964 A1* | 10/2015 | Janarthanam | B60L 11/12 |
| | | | 307/9.1 |
| 2016/0347161 A1* | 12/2016 | Kusumi | B60K 1/04 |
| 2017/0305253 A1* | 10/2017 | Perlo | B60K 1/00 |
| 2018/0072352 A1* | 3/2018 | Shimoda | B60K 1/04 |
| 2018/0111501 A1* | 4/2018 | Takeuchi | B60L 50/64 |
| 2018/0208038 A1* | 7/2018 | Ozawa | B60K 1/04 |
| 2018/0370570 A1* | 12/2018 | Ayukawa | B62D 21/152 |

OTHER PUBLICATIONS

Norio Takami, Keigo Hoshina, and Hiroki Inagaki of Toshiba Corporation, "Lithium Diffusion in Li4/3Ti5/3O4 Particles during Insertion and Extraction", Journal of the Electrochemical Society, 158 (6) A725-A730, published Apr. 15, 2011, pp. A725-A730, Kawasaki, Japan.

Nathaniel S. Pearre, Willett Kempton, Randall L. Guensler, and Vetri V. Elango, "Electric Vehicles: How much range is required for a day's driving?", Elsevier Ltd. Transportation Research Part C, published Dec. 23, 2010, pp. 1171-1184, United Kingdom.

* cited by examiner

VEHICLE BATTERY PACK ASSEMBLY

INTRODUCTION

Electric vehicles may be propelled by electric motors that are powered solely by electrical energy provided by rechargeable batteries. Hybrid vehicles may also depend in part on rechargeable batteries for motive power. High power batteries are generally capable of fast charging and discharging. High energy batteries provide a longer driving range per unit of volume or weight than high power batteries, but are less able to quickly charge and recharge than high power batteries.

SUMMARY

In the event of an impact force that compromises a separation between the negative electrode and the positive electrode of a battery cell, a relatively high power battery cell will release less energy than a relatively high energy battery cell. Accordingly, a hybrid battery system and a vehicle including the hybrid battery system are disclosed in which the high power battery is configured to absorb impact energy to limit the transmission of impact energy to the high energy battery.

A battery system for a vehicle includes a first battery pack and a second battery pack. The first battery pack is configured to be disposed at an outer periphery of the second battery pack and outboard of the second battery pack on the vehicle. The first battery pack has a relatively high power density in comparison to the second battery pack, and the second battery pack has a relatively high energy density in comparison to the first battery pack.

In one or more embodiments, the first battery pack has a first set of battery cells arranged in a ring, and the second battery pack has a second set of battery cells in a center of the ring. The second battery pack may have a bottom, and the first battery pack may have a first set of battery cells laterally outward of both a first side and a second side of the second battery pack and below the bottom of the second battery pack.

In one or more embodiments, the battery system includes a housing supporting the second battery pack and having a series of structural spacer members, each of the structural spacer members disposed between and separating an adjacent pair of battery cells of the second set. The housing may include a first structural side member and a second structural side member bordering a first side and a second side of the second battery pack, respectively, with the structural spacer members connected to and extending between the first structural side member and the second structural side member.

In one or more embodiments, the second battery pack has a front end, a rear end, a first side, and a second side, and the battery system further includes a structural housing outward of the front end, the rear end, the first side, and the second side of the second battery pack, and between the first battery pack and the second battery pack.

In one or more embodiments, the second battery pack includes a second set of battery cells each having a negative electrode of a rechargeable lithium metal.

In one or more embodiments, the first battery pack includes a first set of battery cells each having a negative electrode comprising one or more of a lithium titanate ($Li_2TiO_3$) or graphite, and a positive electrode comprising one or more of a lithium nickel manganese cobalt oxide ($LiNi_xMn_yCo_zO_2$, where the sum of x, y, and z is one), lithium manganese oxide ($LiMn_2O_4$ (spinel)) lithium iron phosphate ($LiFePO_4$), and lithium nickel manganese oxide ($LiNi_xMn_{1-x}O_4$ (spinel), where $0 \leq x \leq 1$).

A vehicle disclosed herein includes an electric motor configured to provide motive torque at wheels of the vehicle. The vehicle includes a battery system operatively connected to the electric motor and operable to provide electrical power to the electric motor. The vehicle has vehicle load-path frame structure configured to absorb an impact force and provide a load path for the impact force. The battery system includes a first battery pack and a second battery pack, the first battery pack having a relatively high power density in comparison to the second battery pack, and the second battery pack having a relatively high energy density in comparison to the first battery pack. The second battery pack is configured to be disposed inboard of the vehicle load-path frame structure on the vehicle, and the first battery pack is configured to be disposed at least partially outboard of the vehicle load-path frame structure on the vehicle.

In one or more embodiments, the first battery pack has a first portion disposed outboard of the vehicle load path structure on a driver side of the vehicle, and a second portion disposed outboard of the vehicle load path structure on a passenger side of the vehicle.

In one or more embodiments, the vehicle load-path frame structure includes longitudinal frame members disposed outboard of the second battery pack. The longitudinal frame members may be between the first battery pack and the second battery pack.

In one or more embodiments, the vehicle load-path frame structure includes transverse frame members disposed outboard of the second battery pack. A first one of the transverse frame members may be forward of the second battery pack, and a second one of the transverse frame members may be rearward of the second battery pack.

In one or more embodiments, the first battery pack has a first set of battery cells, and the second battery pack has a second set of battery cells. The vehicle includes a housing that supports the second battery pack and includes a series of structural spacer members, each of the structural spacer members disposed between and separating an adjacent pair of battery cells of the second set of battery cells.

In one or more embodiments, the housing includes a first structural side member and a second structural side member bordering a first side and a second side of the second battery pack, respectively. The structural spacer members are connected to and extend between the first structural side member and the second structural side member.

In one or more embodiments, the second battery pack has a bottom, and the first battery pack has a first set of battery cells laterally outward of both a first side and a second side of the second battery pack, and below the bottom of the second battery pack.

In one or more embodiments, the first battery pack and the vehicle load-path frame structure are configured to absorb a predetermined amount of energy under an impact on the first battery directed toward the second battery.

In one or more embodiments, the first battery pack includes a first set of battery cells each having a negative electrode comprising one or more of a lithium titanate or graphite.

In one or more embodiments, the first battery pack includes a first set of battery cells each having a positive electrode comprising one or more of a lithium nickel manganese cobalt oxide, lithium manganese oxide, lithium nickel manganese oxide, or lithium iron phosphate ($LiFePO_4$).

The above features and advantages and other features and advantages of the present disclosure are readily apparent from the following detailed description of the best modes for carrying out the disclosure when taken in connection with the accompanying drawings.

DETAILED DESCRIPTION

Figure 1:
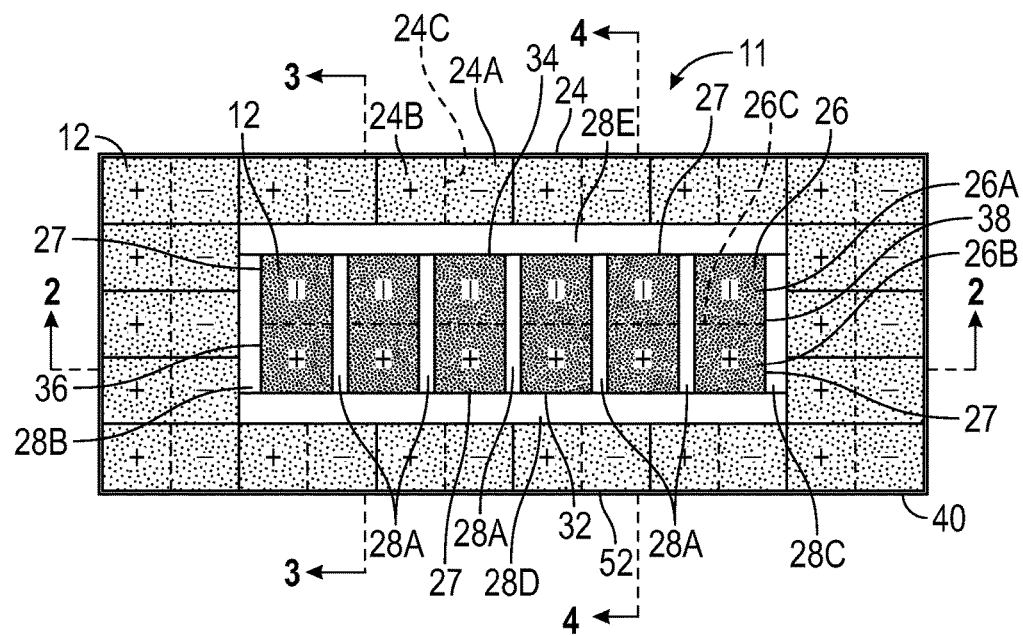
FIG. 1 is a schematic illustration in plan view of a hybrid battery pack and frame.
Figure 5:
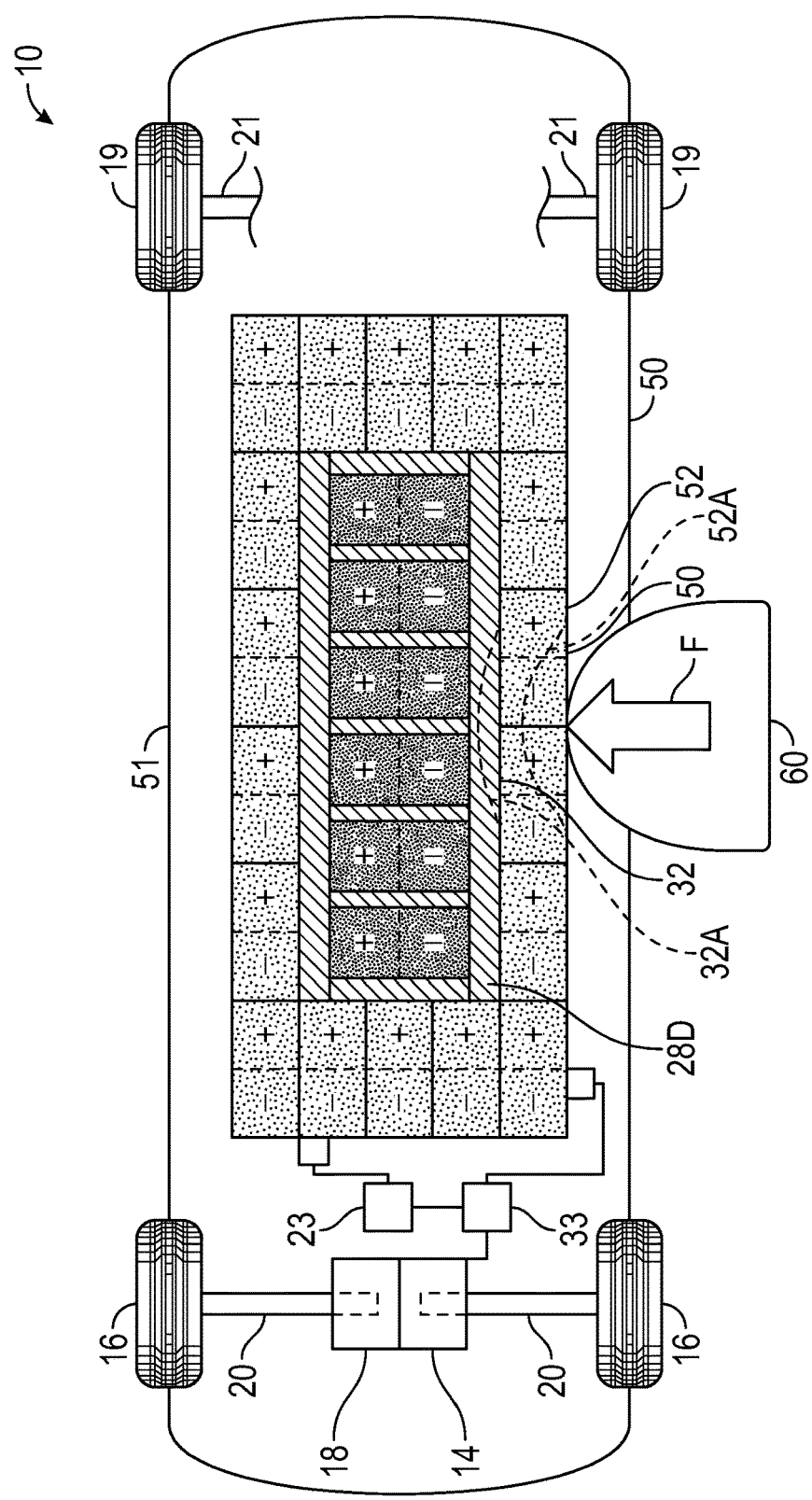
FIG. 5 is a schematic illustration of an electric vehicle including the hybrid battery pack and frame of FIG. 1.

Referring to the drawings, wherein like reference numbers refer to like components throughout the views, FIG. 1 shows a battery system 11 that includes a hybrid battery pack 12 for an electric vehicle, such as electric vehicle 10 of FIG. 5. An electric vehicle, such as electric vehicle 10, electric vehicle 110 of FIG. 6, or electric vehicle 210 of FIG. 7, is powered solely by electric power provided from a hybrid battery pack to one or more electric machines that provide motive force to vehicle wheels and may be referred to as an "all-electric" vehicle. Although depicted on electric vehicles, the hybrid battery pack 12 described herein may be used on a vehicle that utilizes the hybrid battery pack to power one or more electric motors for propulsion, and that also has an internal combustion engine as a source of motive power (e.g., a hybrid electric vehicle).

More specifically, the hybrid battery pack 12 includes a high power battery pack 24, and a high energy battery pack 26. The high power battery pack 24 is also referred to herein as a first battery pack, and has a relatively high power density in comparison to the high energy battery pack 26 (i.e., power per unit of size or per unit of weight, such as in kilowatts per kilogram or per liter). The high power battery pack 24 is useful for its ability to accept higher current during charging than the high energy battery pack 26, enabling what may be referred to as a "fast" charge that may be obtained from a charge source configured to provide relatively high current and that may be, for example, a public charging station remote from the vehicle owner's residence. Access to such a charging source enables the vehicle to continue a driving excursion, and provides a quicker partial or full recharge of the high power battery pack 24, as explained herein.

The high energy battery pack 26 is referred to herein as a second battery pack, and has a relatively high energy density in comparison to the high power battery pack 24 (i.e., energy per unit of weight or per unit of size, such as in kilowatt-hours per kilogram (kWh/kg) or kilowatt-hours per liter (kWh/l)). The high energy battery pack 26 extends the range of the vehicle 10 in comparison to a battery system having the high power battery pack 24 but not the high energy battery pack 26. The high energy battery pack 26 may have a high internal resistance, limiting its ability to accept high current to charge quickly.

The high power battery pack 24 includes a plurality of high power battery cells 24A, 24B that are connected in parallel and/or in series with one another and are constructed to provide or are composed of materials that provide greater power than the high energy battery cells 26A. The battery pack 24 is therefore referred to as the high power battery pack or simply the power battery.

Each high power battery cell 24A, 24B includes a negative electrode 24A, a positive electrode 24B, and a separator 24C, such as a polymeric membrane that separates the material of the negative electrode 24A and the positive electrode 24B while allowing ion transport. The negative electrodes 24A are indicated with a negative sign (−) and the positive electrodes 24B are indicated with a positive sign (+) in FIG. 1. One of the battery cells 24A, 24B is labeled numerically in FIG. 1, but eighteen battery cells 24A, 24B are shown in FIG. 1. Additional layers of battery cells 24A, 24B may be stacked below those shown.

Figure 4:
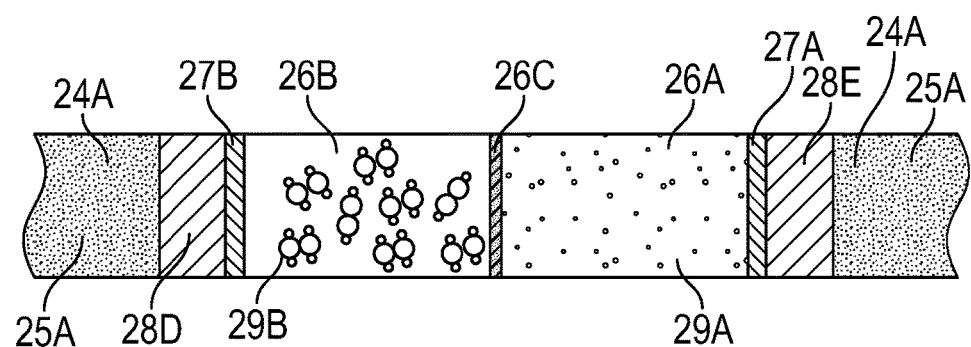
FIG. 4 is a schematic cross-sectional illustration of the hybrid battery pack of FIG. 1 taken at lines 4-4 in FIG. 1.

The high energy battery cells 26A are connected in series and/or in parallel with one another and are composed of materials that provide greater energy than the high power battery cells 24A, and the battery pack 26 is therefore referred to as the high energy battery or simply the energy battery. As shown in FIG. 4, each high power battery cell 26A, 26B includes a negative electrode 26A, a positive electrode 26B, and a separator 26C, such as a polymeric membrane that separates the material of the negative electrode 26A and the positive electrode 26B while allowing ion transport. A current collector 27A is disposed at an end of the negative electrode 26A, and a current collector 27B is disposed at an end of the positive electrode 26B. The current collectors 27A, 27B are not shown in the other FIGS. for clarity in the drawings. Similar current collectors are at the ends of the electrodes in the battery cells 24A, 24B.

The negative electrodes 26A are indicated with a negative sign (−) and the positive electrodes 26B are indicated with a positive sign (+) in FIG. 1. One of the battery cells 26A, 26B is labeled numerically in FIG. 1, but six battery cells 26A, 26B are shown in FIG. 1. Additional layers of battery cells 26A, 26B may be stacked below those shown.

In one embodiment, the high energy battery pack 26 includes Lithium-metal based energy battery cells 26A with 400 Wh/kg energy density, and the high power battery pack 24 includes lithium-titanate based battery cells 24A of about 100 Wh/kg energy density. In this case, the high energy battery pack 26 has about 300% greater specific energy relative to the power battery pack 24. In another embodiment, the high energy battery pack 26 includes Lithium-Ion based energy battery cells 26A with 250 Wh/kg energy density, and the high power battery pack 24 includes Lithium-Ion based battery cells 24A of about 150 Wh/kg energy density. In this case, the high energy battery pack 26 has about 67% greater specific energy relative to the power battery pack 24.

Using allowable charging rate as a rough estimate of the power density of the battery packs 24, 26, in an embodiment, the high power battery pack 24 includes battery cells 24A that are able to charge at the 4 C rate for 80% state-of-charge (SOC), and the high energy battery pack 26 includes battery cells 26A that are able to charge at about the C/3 rate. In this embodiment, the high power battery pack 24 thus has roughly 1100% greater power density than the high energy battery pack 26. The 1 C rate corresponds to the current needed to charge the battery from a fully discharged state to the fully charged state in one hour. The 4 C rate corresponds to the current needed to charge the battery from a fully discharged state to the fully charged state in one quarter of an hour, or 15 minutes.

Example materials 25A, 25B for the high power battery pack 24 include battery cells with a negative electrode comprising one or more of a lithium titanate ($Li_{4+x}Ti_5O_{12}$, where $0 \leq x \leq 3$), and various other Li—Ti—O materials (including Li—Ti—Sc—O, Li—Ti—Nb—O, and Li—Ti—Zn—O), or graphite, and a positive electrode comprising one or more of a lithium nickel manganese cobalt oxide ($LiNi_xMn_yCo_zO_2$, where the sum of x, y, and z is one), lithium manganese oxide ($LiMn_2O_4$ (spinel)), lithium iron phosphate ($LiFePO_4$), and lithium nickel manganese oxide ($LiNi_xMn_{1-x}O_4$ (spinel), where $0 \leq x \leq 1$).

Example materials 29A, 29B for the high energy battery pack 26 include battery cells with a negative electrode comprising one or more of graphite, or of silicon, or of silica, or of rechargeable lithium metal, and a positive electrode comprising one or more of a lithium nickel manganese cobalt oxide ($LiNi_xMn_yCo_zO_2$, where the sum of x, y, and z is one), lithium manganese oxide ($LiMn_2O_4$ (spinel)), lithium iron phosphate ($LiFePO_4$), and lithium nickel manganese oxide ($LiNi_xMn_{1-x}O_4$ (spinel), where $0 \leq x \leq 1$), or a sulfur-based positive electrode.

As shown in FIG. 1, the high power battery pack 24 is configured to be disposed at an outer periphery 27 of the high energy battery pack 26. When disposed on a vehicle, as shown on vehicle 10 in FIG. 5, the high power battery pack 24 is outboard of the high energy battery pack 26. As used herein, "outboard" with respect to a vehicle means further from a center of the vehicle, and inboard means closer to the center of the vehicle 10. Accordingly, a first component is outboard of a second component on a vehicle if: (i) both components are forward of the center of the vehicle, and the first component is further from the center of the vehicle in the longitudinal direction, (ii) both components are rearward of the center of the vehicle, and the first component is further from the center of the vehicle in the longitudinal direction, (iii) both components are between the driver side of the vehicle, and the center of the vehicle and the first component is further from the center of the vehicle in the transverse direction, or (iv) both components are between the passenger side of the vehicle and the center of the vehicle, and the first component is further from the center of the vehicle in the transverse direction.

Figure 2:
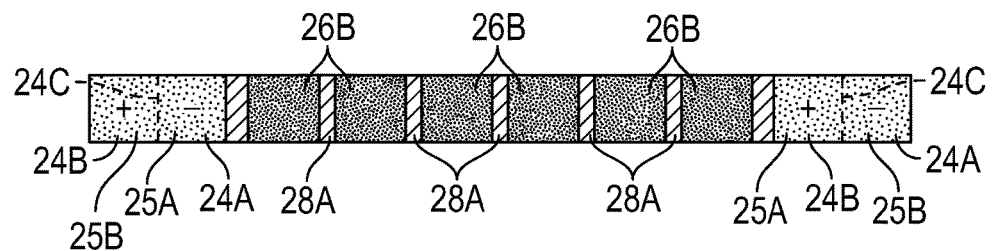
FIG. 2 is a schematic cross-sectional illustration of the hybrid battery pack and frame of FIG. 1 taken at lines 2-2 in FIG. 1.

In the embodiment of FIG. 1, the high power battery cells 24A, 24B are arranged in a ring, which is a rectangular ring in the embodiment shown. The high energy battery cells 26A, 26B are disposed in a center of the ring. The high power battery cells 24A, 24B are thus laterally outward of the high energy battery cells 26A, 26B, and in fact surround the outer periphery of the high energy battery cells 26A, 26B in the plane of the page (i.e., the side periphery of the high energy battery cells 26A, 26B. This is because impact forces on the hybrid battery pack 12 most commonly will come from a direction toward the side faces of the high power battery pack 24. In the hybrid battery pack 12 of FIG. 1, the high power battery cells 24A, 24B are laterally outward of both a first side 32 and a second side 34 (see FIG. 1) of the second battery pack 26, and are forward of a front end 36 and rearward of a rear end 38 of the second battery pack 26. As is apparent in the cross-section of FIG. 2, the high power battery cells 24A, 24B are disposed at side faces of the high energy battery cells 26A, 26B, but are not above the upper faces of the high energy battery cells 26A, 26B and are also not disposed below the lower faces of the high energy battery cells 26A, 26B.

Figure 3:
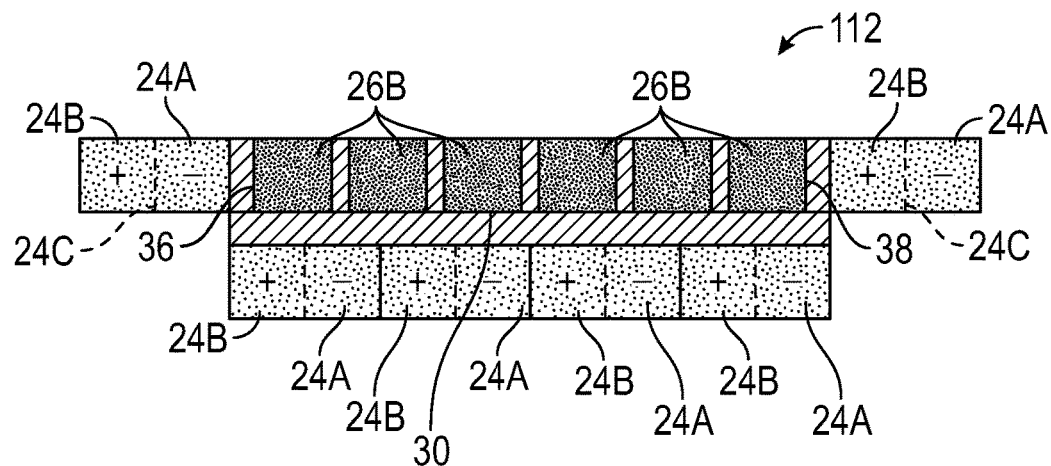
FIG. 3 is a schematic cross-sectional and fragmentary illustration of the hybrid battery pack of FIG. 1 taken at lines 3-3 in FIG. 1.

In an alternate embodiment of a hybrid battery pack 112 shown in FIG. 3, the high power battery cells 24A, 24B are also disposed below the bottom faces of the high energy battery cells 26A, 26B (only battery cells 26B shown in the view of FIG. 3). The hybrid battery pack 112 of FIG. 3 has the same components as described with respect to the hybrid battery pack 12, but includes additional high power battery cells 24A, 24B below the bottom 30 of the high energy battery cells 26A, 26B. Accordingly, in the battery pack 112, the second battery pack 26 has a bottom 30, and the first battery pack 24 has a first set of battery cells 24A, 24B laterally outward of both a first side 32 and a second side 34 (see FIG. 1) of the second battery pack 26, forward of a front 36, rearward of a rear 38 of the second battery pack 26, and below the bottom 30 of the second battery pack 26.

By placing the high power battery cells 24A, 24B outward of the high energy battery cells 26A, 26B, the high power battery cells 24A, 24B act as a shield or cushion, protecting the high energy battery cells 26A, 26B from impact forces on the battery pack 12 that have at least a component in the lateral direction (i.e., in a direction parallel to the plane of the page) and absorbing at least some of the impact energy. The high power battery cells 24A, 24B may be configured as part of the load-bearing, energy absorbing structure. For example, when installed on a vehicle 10 in FIG. 5, the energy absorbing capability of the high power battery cells 24A, 24B is a factor in designing the load-bearing structure of the vehicle, as the high power battery cells 24A, 24B work in concert with the other load-bearing structure such that the high power battery cells 24A, 24B and the other load-bearing structure (such as vehicle frame structure or the battery housing 28) together absorb a predetermined amount of impact energy, protecting the high energy battery cells 26A, 26B from impact energy at or below the predetermined amount. The load-bearing structure may thus potentially be made lighter and/or smaller than without the presence of the high power battery cells 24A, 24B and their contribution to impact energy absorption.

The battery system 11 may also include a housing 28 that supports and protects the high energy battery pack 26. The housing 28 includes a series of structural spacer members 28A, each of which is disposed between and separates an adjacent pair of battery cells 26A and/or 26B of the second set of battery cells. By separating adjacent pairs of the battery cells 26A, 26B, an impact force that has at least a component directed perpendicular to the length of the spacer members 28A (i.e., a component in a direction from one of the battery cells 26A, 26B toward another one of the battery cells 26A, 26B located on an opposite side of the interdisposed spacer member 28A) will be at least partially absorbed by the spacer member 28A. Additionally, the housing 28 includes a first structural side member 32 and a second structural side member 34 border the first side 32 and the second side 34 of the high energy battery pack 26, respectively, with the structural spacer members 28A connected to and extending between the first structural side member 32 and the second structural side member 34.

The structural housing 28 also has a front structural member 28B, a rear structural member 28C, a first structural side member 28D and a second structural side member 28E. The front structural member 28B is forward of the front end 36 of the high energy battery pack 26, and the rear structural member 28C is rearward of the rear end 38 of the high energy battery pack 26. The first structural side member 28D is laterally outward of the first side 32 of the high energy battery pack 26, and the second structural side member 28E is laterally outward of the second side 34 of the high energy battery pack 26. Stated differently, the structural housing 28 is outward of the front end 36, the rear end 38, the first side 32, and the second side 34 of the second battery pack 26.

The high power battery pack 24 is shown forward of, rearward of, and laterally outward of the structural housing 28. The structural housing 28 is thus disposed between the first battery pack 24 and the second battery pack 26 at the front end 36, the rear end 38, the first side 32, and the second side 34 of the second battery pack 26. The structural housing 28, including members 28A, 28B, 28C, 28D, and 28E may be a relatively strong material, such as steel. An outer housing 40 retains and covers the outer periphery of the high power battery pack 24, as shown in FIG. 1. The outer housing 40 may be thinner than the members of the structural housing 28. For example, the outer housing may also be steel, but may be sheets of steel rather than steel bars as are the members of the housing 28.

The vehicle 10 is shown in FIG. 5 with a single electric machine 14 operatively connected to front wheels 16 via a gearing arrangement 18 and half shafts 20. The electric machine 14 is configured to provide motive torque at the wheels 16. In various embodiment, an additional electric machine (not shown) may be similarly operatively connected to the rear wheels 19, an electric machine may be operatively connected to the rear wheels 19 with no electric machine connected to the front wheels 16, or four separate electric machines may be used, a different one operatively connected to each of the front and rear wheels 16, 19. Rear half shafts 21 are shown in fragmentary view in FIG. 5. The electric machine 14 is configured to be operable as a motor during a driving mode of the vehicle 10, with the hybrid battery pack 12 providing electrical power to the electric machine 14. The electric machine 14 is configured to be operable as a generator during regenerative braking of the vehicle 10. An electronic controller 23 operatively connects the hybrid battery pack 12 to the electric machine 14 through a power inverter 33, and executes an energy management method of charging and discharging the hybrid battery pack 12.

The electric machine 14 may be an alternating current (AC) motor. The power inverter 33 may be a three-phase power inverter with gate drive and a capacitive input filter. The power inverter 33 converts direct current (DC) provided from the high power battery pack 24 and/or the high energy battery pack 26 to alternating current (AC) for driving the electric machine 14 as a motor, and converts alternating current to direct current when functioning as a generator during regenerative braking.

One or more sensors (not shown) are in operative communication with each battery cell 24A, 26A and are operatively connected to the electronic controller 23 either directly or via a battery module controller (not shown). The sensors are configured to monitor battery parameters during vehicle operation. For example, the sensors may monitor parameters indicative of the respective state-of-charge (SOC) of each battery cell 24A, 26A, such as voltage, current, temperature, etc. The electronic controller 23, or another controller operatively connected to the electronic controller 23, may include a SOC estimator module that determines a SOC based on the sensor data.

FIG. 5 shows an object 60 impacting the vehicle 10 with an impact force F directed laterally inward toward the first side 32 of the high energy battery pack 26 at the driver side 50 of the vehicle 10. The impact force F is large enough that the object 60, or vehicle components outward of the high power battery pack 24 and between the high powered battery pack 24 and the object 60, contact the first side 52 of the high power battery pack 24, causing the first side 52 of the high power battery pack 24 to deform inward to position 52A, shown in phantom. The first side structural member 28D is also deformed slightly by the object 60 as indicated by the side 32 displaced to position 32A. In this instance, the high power battery cells 24A, 24B and the first side structural member 28D have absorbed the entire impact energy of the object 60, protecting the high energy battery cells 26. The high power battery cells 24 and the structural housing 28 are configured to absorb a predetermined amount of impact energy in this manner. For example, the length and width of the high power battery cells 24A, 24B, and the thickness and material of the structural housing 28 are selected to provide the ability to absorb the predetermined amount of impact energy, such as may be generated by the object having a predetermined weight and impacting the vehicle 10 at a predetermined speed.

Figure 6:
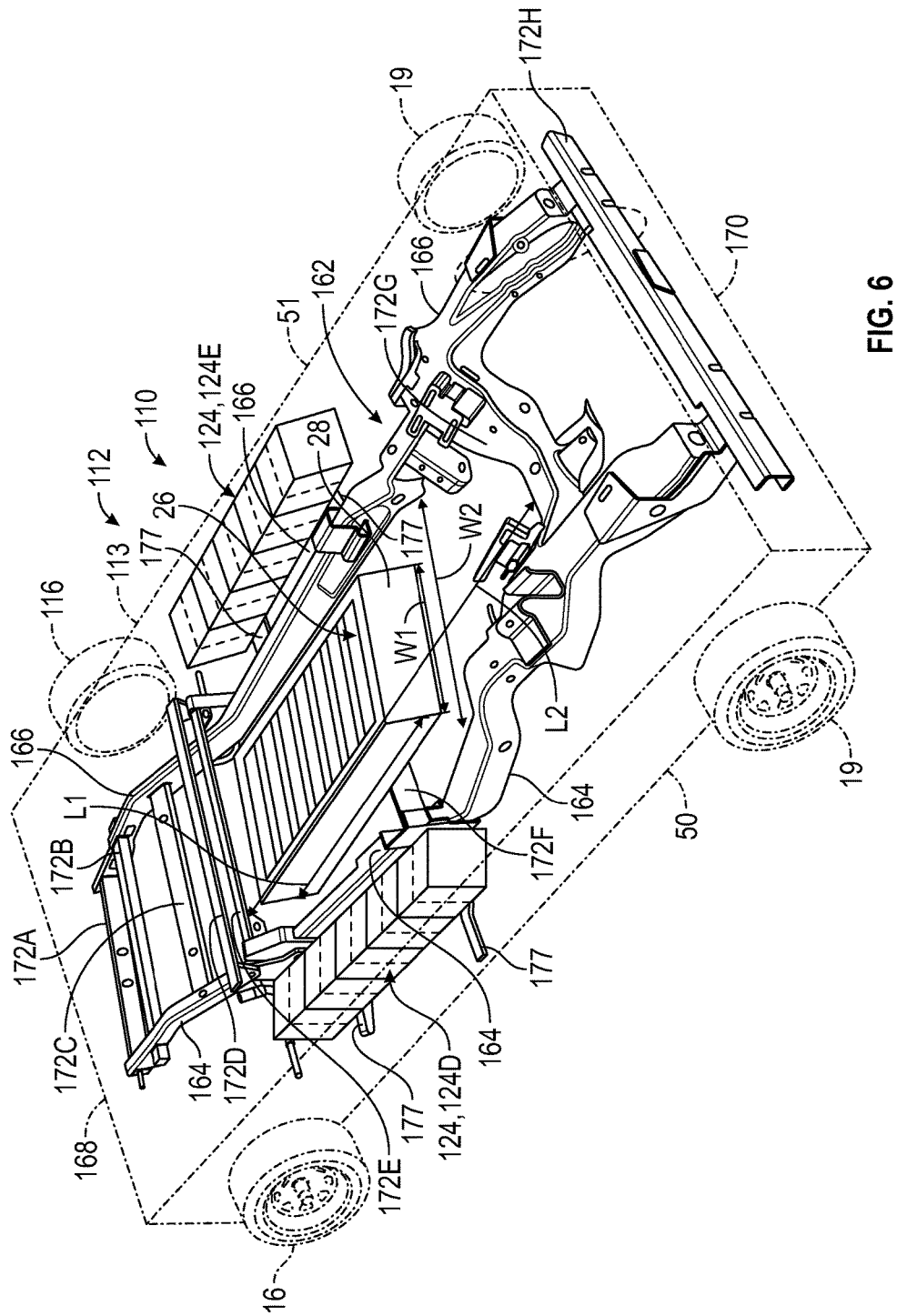
FIG. 6 is a schematic illustration of another embodiment of an electric vehicle with a hybrid battery pack.
Figure 7:
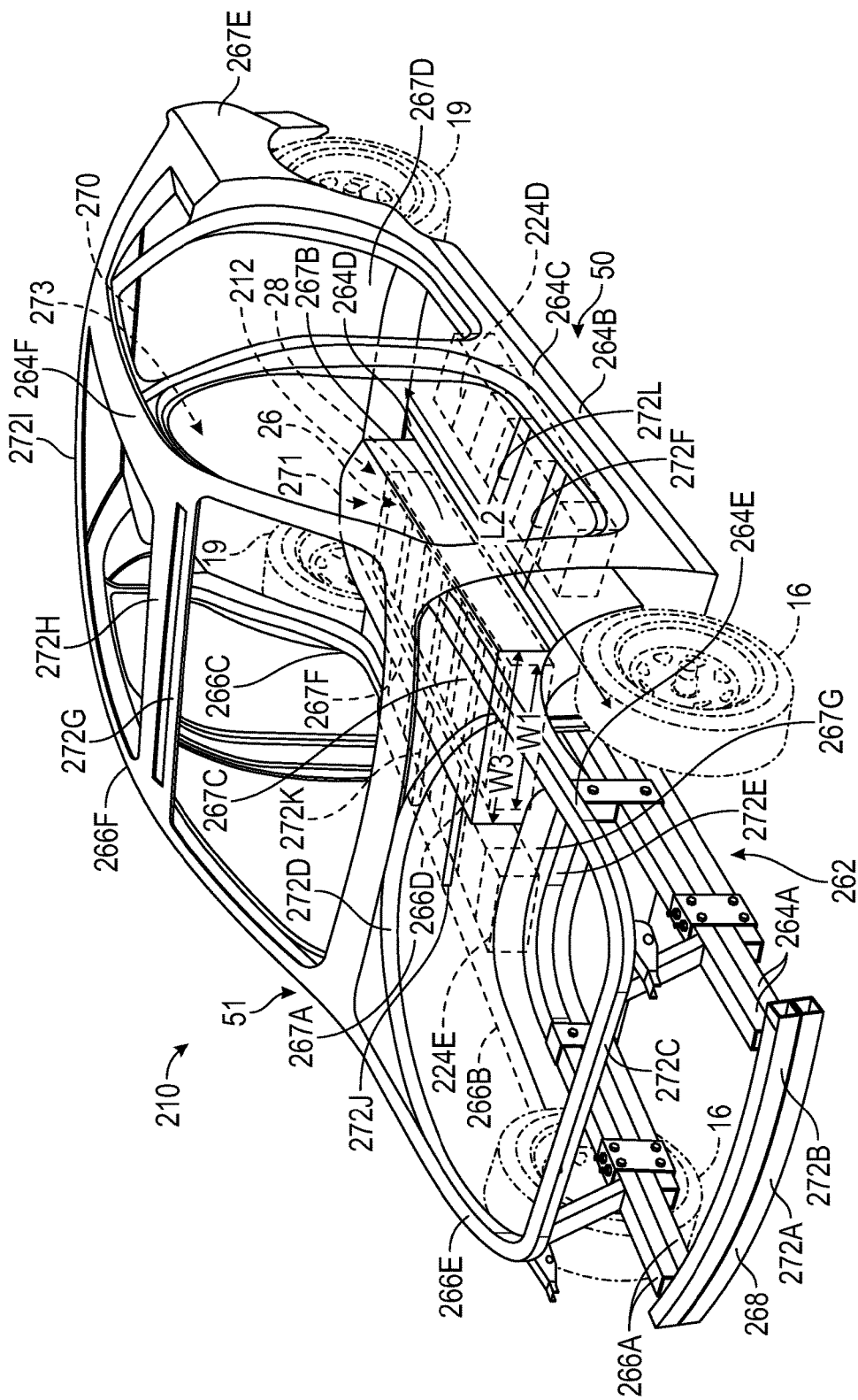
FIG. 7 is a schematic illustration of another embodiment of an electric vehicle with a hybrid battery pack.

FIG. 6 shows another embodiment of an electric vehicle 110 that includes a hybrid battery pack 112. An outline of the body 113 of the vehicle 110 is shown in phantom so that load-path frame structure 162 of the vehicle 110 is visible. The load-path frame structure 162 is a ladder-type frame structure that includes longitudinal frame members 164, 166 extending from near the front 168 of the vehicle 110 to near the rear 170 of the vehicle 110. Each of the longitudinal frame members 164, 166 may include several smaller frame segments joined together to provide a continuous load path extending from the front 168 to the rear 170. The load-path frame structure 162 also includes transverse frame members 172A, 172B, 172C, 172D, 172E, 172F, 172G, and 172H that extend generally transversely and are connected to the longitudinal frame members 164, 166. The longitudinal frame members 164, 166 and the transverse frame members 172A-172H may be extruded or hydroformed steel or aluminum, for example and are configured with sufficient size and strength to provide crash energy management.

The hybrid battery pack 112 includes the high energy battery pack 26 supported and surrounded by the housing 28 as described with respect to FIG. 5. The high energy battery pack 26 is configured to be disposed inboard of the longitudinal frame members 164, 166. Stated differently, the high energy battery pack 26 together with the housing 28 are of a width W1 less than the width W2 of the space between the longitudinal frame members 164, 166 at the high energy battery pack 26.

The hybrid battery pack 112 also includes a high power battery pack 124 composed of high power battery cells 24A, 24B as described with respect to FIG. 1. The high power battery pack 124 includes a first portion 124D and a second portion 124E spaced apart from the first portion 124D. In contrast to the high power battery pack 24 of the hybrid battery pack 12, the first and second portions 124D, 124E of the hybrid battery pack 142 are also spaced apart from the structural housing 28.

The battery packs 124, 26 are configured to be disposed relative to the load-path frame structure 162 so that the high energy battery pack 26 is surrounded by the frame structure 162 both in the lateral and longitudinal directions, and the high power battery pack 124 (portions 124D, 124E) is laterally outboard of the frame structure 162. For example, the longitudinal frame member 164 is a driver-side frame member and is disposed laterally outboard of the high energy battery pack 26 on the driver side 50. The longitudinal frame member 166 is a passenger-side frame member and is disposed laterally outboard of the high energy battery pack 26 on the passenger side 51. The first portion 124D of the high power battery pack 124 is disposed outboard of the longitudinal frame member 164 on the driver side 50. The second portion 124E of the high power battery pack 124 is disposed outboard of the longitudinal frame member 166 on the passenger side 51. The longitudinal frame members 164, 166 are thus between the high power battery pack 124 and the high energy battery pack 26.

The transverse frame members 172A, 172B, 172C, 172D, and 172E are all forward of the high energy battery pack 26. Transverse frame member 172E may be considered a first one of the transverse frame members that is immediately forward of the high energy battery pack 26. Transverse frame members 172G and 172H are rearward of the high energy battery pack 26. Transverse frame member 172G may be considered a second one of the transverse frame members and that is the transverse frame member that is most immediately rearward of the high energy battery pack 26. One of the transverse frame members 172F extends below the high energy battery pack 26. Frame members 177 extend partially transversely and laterally outward of the respective longitudinal frame members 164, 166, and absorb impact forces that have a transverse component at least partially below the hybrid battery pack 112.

The high energy battery pack 26 is configured to be disposed inboard of the transverse frame members 172E and 172G. Stated differently, the high energy battery pack 26 together with the housing 28 are of a length L1 less than the Length L2 of the space between the transverse frame members 172E and 172G.

The high power battery pack portion 124D of the high power battery pack 124 and the longitudinal frame member 164 and one or more of the transverse frame members (depending on the location of an impact force) will absorb the energy of an impact force on the driver side 50 to protect the integrity of the space surrounding the high energy battery pack 26, preventing the impact force from affecting the high energy battery pack 26. The high power battery pack portion 124E and the longitudinal frame member 166 will absorb the energy of an impact force on the passenger side 51 to protect the integrity of the high energy battery pack 26 in a similar manner. The energy absorbing capability of the high power battery pack 124 may be combined with that of the load structure 162 in designing these components in order to meet a predetermined energy absorbing capability (e.g., such as the ability to absorb an impact force of an object of a predetermined size and weight impacting the vehicle 110 at a predetermined speed). The vehicle load-path frame structure 162 is thus configured to absorb impact forces and provide load paths for the impact forces that direct the load around the high energy battery pack 26 rather than onto or through the high energy battery pack 26.

FIG. 7 shows another embodiment of an electric vehicle 210 that includes a hybrid battery pack 212. The load-path frame structure 262 of the vehicle 210 is shown. The load-path frame structure 262 is a body-frame-integral design that includes various longitudinal frame members. Some of the longitudinal frame members 264A, 264B, 264C, 264D, 264E, 264F, 266A, 266B, 266C, 266D, 266E, and 266F are indicated with reference numbers. The longitudinal frame members 264A-264F, 266A-266F extend from near the front 268 of the vehicle 210 to near the rear 270 of the vehicle 210. The load-path frame structure 262 also includes transverse frame members 272A, 272B, 272C, 272D, 272E, 272F, 272G, 272H, 272I, 272J, and 272K. The transverse frame members 272A-272K extend generally transversely and are connected to different ones of the longitudinal frame members 264A-264F, 266A-266F and/or to sheet metal components 267A-267G. The longitudinal frame members 264A-264F, 266A-266F and the transverse frame members 272A-272K may be stamped or otherwise formed and may be steel or aluminum. Some of the longitudinal frame members 264A-264F, 266A-266F and transverse frame members 272A-272K are welded and/or adhesively bonded to sheet metal components such as sheet metal components 267A-267F. Each of the longitudinal frame members and transverse frame members may include several smaller frame segments joined together to provide a continuous load path extending from the front 268 to the rear 270.

The sheet metal components 267B, 267C and 267F form a raised structure in the middle of the vehicle 210 that provides a cavity 271 under the passenger compartment 273. The raised structure and cavity 271 are similar to what is sometimes referred to as a transmission tunnel in some vehicles. The sheet metal components 267B, 267C, 267F are reinforced by some of the longitudinal and transverse frame members 264D, 266D, 272E, and are further reinforced laterally outward of the raised structure by longitudinal frame members 264B, 266B, as well as by transverse frame members 272F, 272J, 272K, 272L The hybrid battery pack 212 includes the high energy battery pack 26 supported and surrounded by the housing 28 as described with respect to FIG. 5. The high energy battery pack 26 is configured to be disposed in the cavity 271. The high energy battery pack 26 and housing 28 are thus disposed inboard of the longitudinal frame members 264B, 264C, 264D, 266B, 266C, and 266D. Stated differently, the high energy battery pack 26 together with the housing 28 are of a width W1 less than the width W3 of the space between the longitudinal frame members 264D, 266D. It should be appreciated that the numerical value of width W1 may be different in FIGS. 6 and 7.

The hybrid battery pack 212 also includes a high power battery pack 224 composed of high power battery cells 24A, 24B as described with respect to FIG. 1. The high power battery pack 224 includes a first portion 224D and the second portion 224E spaced apart from the first portion 224D as described with respect to first and second portions 124D, 124E of FIG. 6. The portions 224D, 224E are below the frame structure and sheet metal components described that together serve as the passenger compartment floor.

The battery packs 224, 26 are configured to be disposed relative to the load-path frame structure 262 so that the high energy battery pack 26 is surrounded by the frame structure 262 both in the lateral and longitudinal directions, and the high power battery pack 224 (portions 224D, 224E) is laterally outboard of at least some of the frame structure 262. For example, the longitudinal frame member 264D is a driver-side frame member and is disposed laterally outboard of the high energy battery pack 26 on the driver side 50. The longitudinal frame member 266D is a passenger side frame member and is disposed laterally outboard of the high energy battery pack 26 on the passenger side 51. The first portion 224D of the high power battery pack 224 is disposed outboard of the longitudinal frame member 264D on the driver side 50. The second portion 224E of the high power battery pack 224 is disposed outboard of the longitudinal frame member 266D on the passenger side 51. The longitudinal frame members 264D, 266D are thus between the high power battery pack 224 and the high energy battery pack 26. Longitudinal frame members 264B, 264C are laterally outboard of the first portion 224D on the driver side 50, and similar longitudinal frame members, represented by longitudinal frame member 266D, are laterally outboard of the second portion 224D on the passenger side 51.

The transverse frame members 272A, 272B, 272C, and 272E are all forward of the high energy battery pack 26. Transverse frame member 272E may be considered a first one of the transverse frame members that is immediately forward of the high energy battery pack 26. Additional transverse frame members (not visible in the view of FIG. 7) are rearward of and at the same level as the high energy battery pack 26.

The high energy battery pack 26 is configured to be disposed inboard of the transverse frame member 272E and sheet metal component 267A. Stated differently, the high energy battery pack 26 together with the housing 28 are of a length L1 less than the Length L2 of the space between the transverse frame member 272E and the sheet metal component 267D. It should be appreciated that the numerical values of lengths L1 and L2 may be different in FIGS. 6 and 7.

The high power battery pack portion 224D of the high power battery pack 224 and at least the longitudinal frame members 264B, 264C, 264D and one or more of the transverse frame members 272F, 272L (depending on the location of an impact force) will absorb the energy of an impact force on the driver side 50 to protect the integrity of the space surrounding the high energy battery pack 26, preventing the impact force from affecting the high energy battery pack 26.

The high power battery pack portion 224E and at least the longitudinal frame members 266B, 266D and one or more of the sheet metal components will absorb the energy of an impact force on the passenger side 51 to protect the integrity of high energy battery pack 26 in a similar manner. The energy absorbing capability of the high power battery pack 224 may be combined with that of the load structure 262 in designing these components in order to meet a predetermined energy absorbing capability (e.g., such as the ability to absorb an impact force of an object of a predetermined size and weight impacting the vehicle 210 at a predetermined speed). The vehicle load-path frame structure 262 is thus configured with sufficient size and strength to absorb impact forces and provide load paths for the impact forces that direct the load around the high energy battery pack 26 rather than onto or through the high energy battery pack 26.

While the best modes for carrying out the disclosure have been described in detail, those familiar with the art to which this disclosure relates will recognize various alternative designs and embodiments for practicing the disclosure within the scope of the appended claims.

What is claimed is:

1. A vehicle comprising:
   an electric motor configured to provide motive torque at wheels of the vehicle;
   a battery system operatively connected to the electric motor and operable to provide electrical power to the electric motor;
   vehicle load-path frame structure configured to absorb an impact force and provide a load path for the impact force;
   wherein the battery system includes a first battery pack and a second battery pack, the first battery pack having a relatively high power density in comparison to the second battery pack, and the second battery pack having a relatively high energy density in comparison to the first battery pack; and
   wherein the second battery pack is configured to be disposed inboard of the vehicle load-path frame structure on the vehicle, and the first battery pack is configured to be disposed at least partially outboard of the vehicle load-path frame structure on the vehicle.

2. The vehicle of claim 1, wherein:
   the first battery pack has a first portion disposed outboard of the vehicle load-path frame structure on a driver side of the vehicle, and a second portion disposed outboard of the vehicle load-path frame structure on a passenger side of the vehicle.

3. The vehicle of claim 1, wherein the vehicle load-path frame structure includes longitudinal frame members disposed outboard of the second battery pack.

4. The vehicle of claim 3, wherein the longitudinal frame members are between the first battery pack and the second battery pack.

5. The vehicle of claim 1, wherein the vehicle load-path frame structure includes transverse frame members disposed outboard of the second battery pack.

6. The vehicle of claim 5, wherein:
   a first one of the transverse frame members is forward of the second battery pack; and
   a second one of the transverse frame members is rearward of the second battery pack.

7. The vehicle of claim 1, wherein the first battery pack has a first set of battery cells, and the second battery pack has a second set of battery cells, and further comprising:
   a housing supporting the second battery pack and including a series of structural spacer members, each of the structural spacer members disposed between and separating an adjacent pair of battery cells of the second set of battery cells.

8. The vehicle of claim 7, wherein the housing includes a first structural side member and a second structural side member bordering a first side and a second side of the second battery pack, respectively, with the structural spacer members connected to and extending between the first structural side member and the second structural side member.

9. The vehicle of claim 1, wherein:
   the second battery pack has a bottom; and
   the first battery pack has a first set of battery cells laterally outward of both a first side and a second side of the second battery pack and below the bottom of the second battery pack.

10. The vehicle of claim 1, wherein the first battery pack and the vehicle load-path frame structure are configured to absorb a predetermined amount of energy under an impact on the first battery directed toward the second battery.

11. The vehicle of claim 1, wherein the first battery pack includes a first set of battery cells each having a negative electrode comprising one or more of a lithium titanate or graphite.

12. The vehicle of claim 1, wherein the first battery pack includes a first set of battery cells each having a positive electrode comprising one or more of a lithium manganese oxide, lithium nickel manganese oxide, lithium nickel manganese cobalt oxide, or lithium iron phosphate.

13. A battery system for a vehicle, comprising:
   a first battery pack and a second battery pack;
   wherein the first battery pack is configured to be disposed at an outer periphery of the second battery pack and outboard of the second battery pack on the vehicle;
   wherein the first battery pack has a relatively high power density in comparison to the second battery pack, and the second battery pack has a relatively high energy density in comparison to the first battery pack; and wherein the second battery pack has a bottom, and the first battery pack has a first set of battery cells laterally outward of both a first side and a second side of the second battery pack and below the bottom of the second battery pack.

14. The battery system of claim 13, wherein:
the first battery pack has a first set of battery cells arranged in a ring, and the second battery pack has a second set of battery cells in a center of the ring.

15. The battery system of claim 13, further comprising:
a housing supporting the second battery pack and including a series of structural spacer members, each of the structural spacer members disposed between and separating an adjacent pair of battery cells of the second set.

16. The battery system of claim 15, wherein the housing includes a first structural side member and a second structural side member bordering a first side and a second side of the second battery pack, respectively, with the structural spacer members connected to and extending between the first structural side member and the second structural side member.

17. The battery system of claim 13, wherein the second battery pack has a front end, a rear end, a first side, and a second side, and further comprising:
a structural housing outward of the front end, the rear end, the first side, and the second side of the second battery pack, and between the first battery pack and the second battery pack.

18. The battery system of claim 13, wherein the second battery pack includes a second set of battery cells each having a negative electrode of a rechargeable lithium metal.

19. The battery system of claim 13, wherein:
the first battery pack includes a first set of battery cells each having a negative electrode comprising one or more of a lithium titanate ($Li_2TiO_3$) or graphite, and a positive electrode comprising one or more of a nickel manganese cobalt oxide ($Ni_xMn_yCo_zO_2$, where the sum of x, y, and z is one), lithium manganese oxide ($LiMn_2O_4$ (spinel)), lithium nickel manganese cobalt oxide ($LiNiMnCoO_2$), lithium iron phosphate ($LiFePO_4$).

20. A battery system for a vehicle, comprising:
a first battery pack and a second battery pack;
wherein the first battery pack is configured to be disposed at an outer periphery of the second battery pack and outboard of the second battery pack on the vehicle;
wherein the first battery pack has a relatively high power density in comparison to the second battery pack, and the second battery pack has a relatively high energy density in comparison to the first battery pack; and
wherein the first battery pack has a first set of battery cells arranged in a continuous ring, and the second battery pack has a second set of battery cells in a center of the continuous ring.

* * * * *